United States Patent
Lin et al.

(10) Patent No.: US 11,492,467 B2
(45) Date of Patent: *Nov. 8, 2022

(54) POLYETHYLENE FORMULATIONS WITH IMPROVED BARRIER AND ENVIRONMENTAL STRESS CRACK RESISTANCE

(71) Applicant: Dow Global Technologies LLC, Midland, MI (US)

(72) Inventors: Yijian Lin, Freeport, TX (US); John L. Sugden, Midland, MI (US); Mridula Kapur, Freeport, TX (US); David T. Gillespie, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/062,174

(22) PCT Filed: Dec. 15, 2016

(86) PCT No.: PCT/US2016/066817
§ 371 (c)(1),
(2) Date: Jun. 14, 2018

(87) PCT Pub. No.: WO2017/112510
PCT Pub. Date: Jun. 29, 2017

(65) Prior Publication Data
US 2018/0371217 A1    Dec. 27, 2018

(51) Int. Cl.
*C08L 23/06* (2006.01)
*C08K 5/098* (2006.01)
(Continued)

(52) U.S. Cl.
CPC .............. *C08L 23/06* (2013.01); *C08K 5/053* (2013.01); *C08K 5/098* (2013.01); *C08K 5/20* (2013.01);
(Continued)

(58) Field of Classification Search
None
See application file for complete search history.

(56) References Cited

U.S. PATENT DOCUMENTS

| 4,100,105 A | 7/1978 | Levine et al. |
| 6,022,933 A | 2/2000 | Wright et al. |

(Continued)

FOREIGN PATENT DOCUMENTS

| CL | 2018001641 A1 | 8/2018 |
| CL | 2018001658 A1 | 11/2018 |

(Continued)

OTHER PUBLICATIONS

"Variables That Effect/Control High Density Polyethylene Film Oxygen/Moisture Barrier", William G. Todd, originally presented at ANTEC 2003.
(Continued)

*Primary Examiner* — Satya B Sastri
(74) *Attorney, Agent, or Firm* — Dinsmore & Shohl LLP

(57) ABSTRACT

Polyethylene formulations and articles produced therefrom, comprise a multimodal high density polyethylene (HDPE) composition, and 0.1 ppm to 300 ppm of a nucleating agent, wherein the multimodal HDPE composition comprises a density of 0.940 g/cm³ to 0.970 g/cm³ when measured according to ASTM D792, and a melt index (I2) of 0.1 g/10 min. to 10.0 g/10 min. when measured according to ASTM D1238 at 190° C. and a 2.16 kg load, and wherein the multimodal HDPE composition comprises an infrared cumulative detector fraction ($CDF_{IR}$) of greater than 0.27

(Continued)

and an infrared cumulative detector fraction to light scattering cumulative detector fraction ratio ($CDF_{IR}/CDF_{LS}$) from 0.7 to 2.0.

18 Claims, 2 Drawing Sheets

(51) Int. Cl.
  *C08K 5/053* (2006.01)
  *C08K 5/20* (2006.01)
  *C08K 5/521* (2006.01)
  *B65D 41/00* (2006.01)

(52) U.S. Cl.
  CPC ............ *C08K 5/521* (2013.01); *B65D 41/00* (2013.01); *C08L 2201/14* (2013.01); *C08L 2203/30* (2013.01); *C08L 2205/025* (2013.01); *C08L 2205/24* (2013.01); *C08L 2207/062* (2013.01)

(56) References Cited

U.S. PATENT DOCUMENTS

| | | | |
|---|---|---|---|
| 6,599,971 B2 † | 7/2003 | Dotson | |
| 6,809,154 B2 * | 10/2004 | Lindahl | C08L 23/06 525/191 |
| 7,396,878 B2 | 7/2008 | Lustiger et al. | |
| 7,592,397 B2 | 9/2009 | Markovich et al. | |
| 7,714,071 B2 | 5/2010 | Hoenig et al. | |
| 8,022,143 B2 | 9/2011 | Wang | |
| 8,436,085 B2 * | 5/2013 | Borke | C08J 5/18 106/170.35 |
| 8,946,326 B2 | 2/2015 | Kulshreshtha et al. | |
| 8,962,755 B2 | 2/2015 | Wang et al. | |
| 9,187,627 B2 * | 11/2015 | Mehta | C08L 23/06 |
| 2003/0229186 A1 * | 12/2003 | Mawson | C08F 210/16 526/61 |
| 2006/0047076 A1 | 3/2006 | Scheie | |
| 2010/0081767 A1 | 4/2010 | McLeod et al. | |
| 2010/0084363 A1 | 4/2010 | Michie, Jr. et al. | |
| 2010/0159173 A1 | 6/2010 | Ashbaugh et al. | |
| 2013/0343808 A1 | 12/2013 | Domoy et al. | |
| 2014/0171582 A1 | 6/2014 | Wang et al. | |
| 2015/0094418 A1 | 4/2015 | Wang et al. | |
| 2015/0203671 A1 * | 7/2015 | Aubee | C08L 23/06 524/396 |
| 2015/0353715 A1 † | 12/2015 | Wang | |
| 2019/0002673 A1 | 1/2019 | Fernandez et al. | |

FOREIGN PATENT DOCUMENTS

| | | |
|---|---|---|
| CN | 101987891 A | 3/2011 |
| EP | 1146077 A1 | 10/2001 |
| EP | 1790580 A1 | 5/2007 |
| EP | 2130860 A1 | 12/2009 |
| EP | 2218751 A1 | 8/2010 |
| EP | 2360192 A1 | 8/2011 |
| EP | 2746334 A1 | 6/2014 |
| JP | 2001040151 A | 2/2001 |
| JP | 2001192513 A | 7/2001 |
| WO | 2004094489 A1 | 11/2004 |
| WO | 2004101674 A1 | 11/2004 |
| WO | 2005/090464 A1 † | 9/2005 |
| WO | 2005090464 A1 | 9/2005 |
| WO | WO-2005090464 A1 * | 9/2005 ............ B32B 27/00 |
| WO | 2007033297 A1 | 3/2007 |
| WO | 2007096894 A1 | 8/2007 |
| WO | 2007130515 A1 | 11/2007 |
| WO | 2008136849 A1 | 11/2008 |
| WO | 2009130200 A1 | 10/2009 |
| WO | 2010047743 A1 | 4/2010 |
| WO | 2010088265 A1 | 8/2010 |
| WO | 2011050042 A1 | 4/2011 |
| WO | 2017112503 A2 | 6/2017 |

OTHER PUBLICATIONS

Nucleation of Polyethylene Blown File, Dolan H. Place Conference, Sep. 17-21, 2006.
Arguments made by the proprietor in Notice of opposition against EP2081990.,Aug. 2013.
Communication Pursuant to Article 114(2) EPC, Third Party Observations dated May 27, 2019, EP Application No. 16829452.8.
Chilean Examination Report dated Feb. 13, 2019, pertaining to Chilean patent application No. 2018-001563.
International Search Report and Written Opinion pertaining to PCT/US2016/066784 dated Aug. 4, 2017.
International Search Report and Written Opinion pertaining to PCT/US2016/066817 dated Mar. 22, 2017.
Zimm et al., "Apparatus and Methods for Measurement and Interpretation of the Angular Variation of Light Scattering; Preliminary Results on Polystyrene Solutions", The Journal of Chemical Physics. 1948, vol. 16, No. 12, 1099-1116.
Heather Dolan, Nucleation of Polyethylene Blown Film, pp. 1-14, 2006 PLACE Conference, Sep. 17-21, 2006.†
William G. Todd, Variables that Affect/Control High Density Polyethylene Film Oxygen/Moisture Barrier, ANTEC 2001, May 4-8, 2003, Nashville, TN, pp. 1-9.†
Dolan, Heather, Nucleation of Polyethylene Blown Film, pp. 1-14, 2006 PLACE Conference, Sep. 17-21, 2006, Cincinnati, OH.†
Todd, William G., Variables That Affect/Control High Density Polyethylene Film Oxygen/Moisture Barrier, ANTEC 2003, Nashville, TN, May 4-8, 2003, pp. 1-9.†
European Patent Office Communication pursuant to Rule 114(2) EPC; pp. 1-139.†

\* cited by examiner
† cited by third party

POLYETHYLENE FORMULATIONS WITH IMPROVED BARRIER AND ENVIRONMENTAL STRESS CRACK RESISTANCE

CROSS REFERENCE TO RELATED APPLICATIONS

This application claims priority to U.S. Provisional Patent Application Ser. No. 62/270,151, filed Dec. 21, 2015, which is incorporated by reference in its entirety.

TECHNICAL FIELD

Embodiments of the present disclosure generally relate to polyethylene formulations. More specifically, embodiments of the present disclosure relate to articles including the polyethylene formulations which provide improved barrier properties and improved environmental stress crack resistance (ESCR) comprising multimodal high density polyethylene (HDPE) and a nucleating agent.

BACKGROUND

In manufacturing molded articles, such as plastic closure devices and plastic containers, the environmental stress crack resistance (ESCR) of a molded article is very important to prevent an uncontrolled release of the container materials. It is also important that the molded article possess adequate stiffness, demonstrated by tensile modulus, to prevent deformation when stacked during transportation and storage. High density polyethylene (HDPE) is known to be used in manufacturing these molded articles to achieve sufficient article stiffness. However, while the use of HDPE favorably increases the article stiffness, the use of a higher density resin unfavorably decreases the ESCR. Furthermore, while it is desirable to reduce the weight of the manufactured molded articles to decrease costs in shipping and storage, decreasing the weight of molded articles decreases the barrier performance of the container materials.

To combat these deficiencies, nucleating agents can be used. Nucleating agents are often employed in polypropylene-based compositions; however, due to the fast crystallization rate, typically nucleating agents are not as effective when used with HDPE. The addition of excessive amounts of nucleating agents to HDPE may cause a lower shrinkage and thus result in larger dimensions of molded articles.

Accordingly, ongoing needs may exist for HDPE formulations to be used in manufacturing molded articles that exhibit sufficient stiffness, proper shrinkage, an improved ESCR and improved barrier properties while reducing the weight of the article.

SUMMARY

Embodiments of the present disclosure address these needs by utilizing a polyethylene formulation comprising a multimodal HDPE composition and low amounts of a nucleating agent to reduce the weight of manufactured molded articles while exhibiting improved barrier performance, sufficient stiffness, proper shrinkage, and sufficient fluidity for manufacturing processes, such as injection molding applications.

In a first embodiment of the present disclosure, a polyethylene formulation is provided. The polyethylene formulations comprise a multimodal high density polyethylene (HDPE) composition, and 0.1 ppm to 300 ppm of a nucleating agent. The multimodal HDPE composition comprises a density of 0.940 g/cm$^3$ to 0.970 g/cm$^3$ when measured according to ASTM D792, and a melt index ($I_2$) of 0.1 g/10 min. to 10.0 g/10 min. when measured according to ASTM D1238 at 190° C. and a 2.16 kg load. Moreover, the multimodal HDPE composition comprises an infrared cumulative detector fraction ($CDF_{IR}$) of greater than 0.27 and an infrared cumulative detector fraction to light scattering cumulative detector fraction ratio ($CDF_{IR}/CDF_{LS}$) from 0.7 to 2.0, wherein the $CDF_{IR}$ is computed by measuring the area fraction of an IR5 measurement channel (IR) detector chromatogram less than 15,000 g/mol molecular weight using Gel Permeation Chromatography (GPC), and wherein the $CDF_{LS}$ is computed by measuring the area fraction of a low angle laser light scattering (LALLS) detector chromatogram greater than 1,000,000 g/mol molecular weight using GPC.

In a second embodiment, an article made from the polyethylene formulation is provided. The article may comprise a molded article or a fabricated article.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the drawings enclosed herewith.

Figure 1:
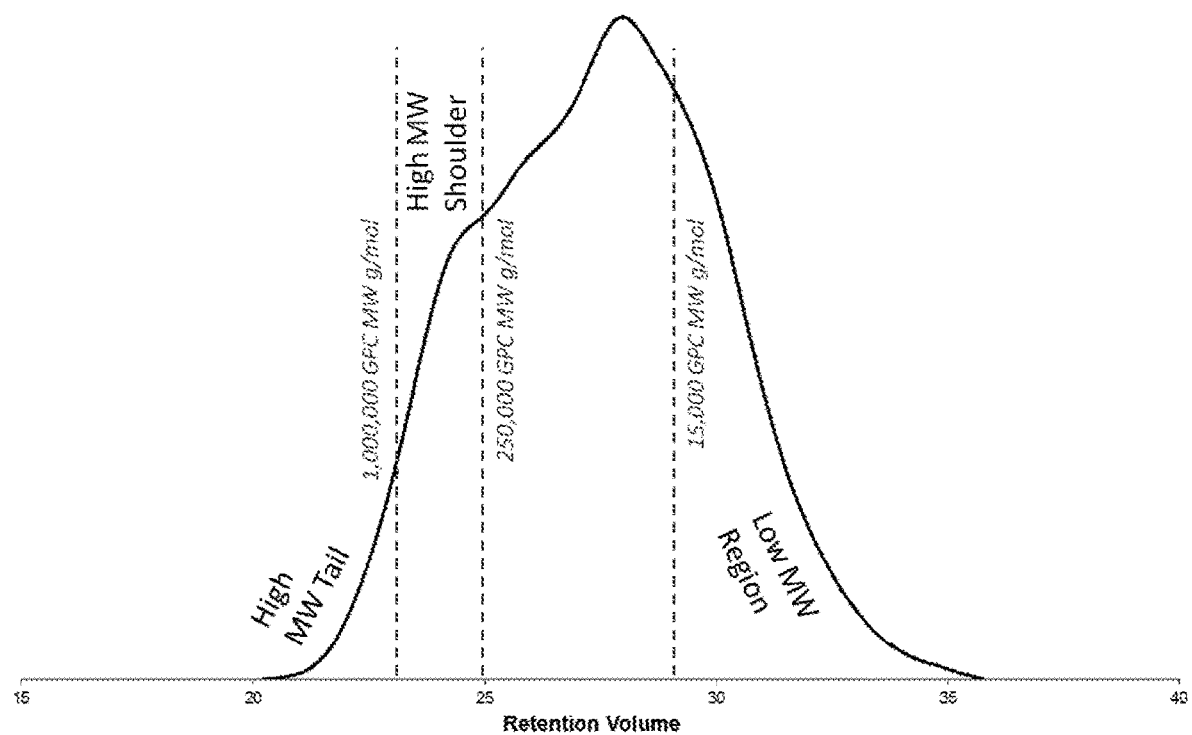
FIG. 1 is a graphical depiction of an IR5 Measurement chromatogram integration window used in the calculation of $CDF_{IR}$ as detailed further below.

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to polyethylene formulations and articles made therefrom that provide improved barrier and ESCR performance. The embodiments of the polyethylene formulations include, among other things, a multimodal HDPE composition and 0.1 ppm to 300 ppm of a nucleating agent. The multimodal HDPE composition has a density of 0.940 g/cm$^3$ to 0.970 g/cm$^3$ when measured according to ASTM D792, and a melt index ($I_2$) of 0.1 g/10 min. to 10.0 g/10 min. when measured according to ASTM D1238 at 190° C. and a 2.16 kg load. Moreover, the multimodal HDPE composition has a $CDF_{IR}$ of greater than 0.27 and a ($CDF_{IR}/CDF_{LS}$) ratio from 0.7 to 2.0, wherein the $CDF_{IR}$ is computed by measuring the area fraction of an IR5 measurement channel detector chromatogram less than 15,000 g/mol molecular weight using GPC, and wherein the $CDF_{LS}$ is computed by measuring the area fraction of a low angle laser light scattering detector chromatogram greater than 1,000,000 g/mol molecular weight using GPC.

Another embodiment of the present invention includes, among other things, an article produced from the polyethylene formulation comprising an injection-molded film, an injection-molded article, a blown film, a blow molded article, a molded article, a melt-spun fiber, or an extruded article, which provides, among other things, improved barrier properties, improved ESCR, sufficient stiffness, proper shrinkage, and reduced article weight. The following description of the embodiments is illustrative in nature and is in no way intended to be limiting in its application or use.

The term "polyethylene formulation," as used herein, means any composition comprising a polyethylene polymer solely, or with additional components, such as an additional polymer or a nucleating agent.

The term "polyethylene polymer," as used herein, refers to a polymer made of 100% ethylene-monomer units (a homopolymer) or refers to copolymers (for example, an interpolymer) produced with other monomeric moieties, such as α-olefins (including, but not limited to, propylene, 1-butene, 1-pentene, 1-hexene, 1-octene, and so forth) wherein the copolymer comprises greater than 50% of its units from ethylene. Various polyethylene polymers are contemplated as suitable. For example and not by way of limitation, the polyethylene polymer may comprise HDPE, wherein the HDPE is a polyethylene polymer with a density greater than 0.940 g/cm$^3$.

The term "interpolymer," as used herein, refers to polymers prepared by the polymerization of at least two different types of monomers. Interpolymer is a generic term which includes copolymers, usually employed to refer to polymers prepared from two different types of monomers, and polymers prepared from more than two different types of monomers.

The term "nucleating agent," as used herein, refers to a compound which increases the overall rate of crystallization or nucleation of a polymer.

The term "proper shrinkage," as used herein, refers to improving color leveling properties and is defined as having a less shrinkage variation across different colors. All polymers undergo shrinkage from the melt to the solid, and the shrinkage level often varies depending on the type of colorant added. Articles having too low or too high shrinkage often result in unusable product, increasing the manufacturing scrap rate.

The term "multimodal," as used herein, means that the molecular weight distribution (MWD) in a GPC curve exhibits two or more component polymers, for example, two or more peaks or wherein one component polymer may even exist as a hump, shoulder, or tail, relative to the MWD of the other component polymers; or in the alternative, wherein two or more components may have only one single peak with no bumps, shoulders, or tails but the components can be separated by deconvolution of the GPC chromatogram curve.

In one or more embodiments of the present disclosure, the multimodal HDPE may be a bimodal HDPE. The term "bimodal," as used herein, means that the MWD in a GPC curve exhibits two component polymers wherein one component polymer may even exist as a hump, shoulder or tail relative to the MWD of the other component polymer. A bimodal MWD can be deconvoluted into two primary components: a first ethylene polymer component and a second ethylene polymer component. As described further below, the first ethylene polymer component may have a higher density than the second ethylene polymer component as determined from the following equation:

$$\frac{1}{overall.density.} = \frac{weight.fraction.of.1st.ethylene.component}{density.of.1st.ethylene.component} + \frac{weight.fraction.of.2nd.ethylene.component}{density.of.2nd.ethylene.component} \quad \text{(Equation 1)}$$

Moreover, the first ethylene polymer component may have a lower weight-average molecular weight than the second ethylene polymer component. After deconvolution, the peak width at half maxima (WAHM), the number-average molecular weight (Mn), weight-average molecular weight (Mw), and weight fraction of each component can be obtained.

The first ethylene polymer component and/or the second ethylene polymer component of the composition may be an ethylene-based interpolymer, ethylene homopolymer, ethylene/α-olefin interpolymer, homogeneously branched ethylene-based interpolymer or copolymer, or a heterogeneously branched ethylene-based interpolymer or copolymer. Without being bound by theory, homogeneously branched interpolymers may be produced, for example, by single-site catalyst systems, and contain a substantially homogeneous distribution of comonomer among the molecules of the interpolymer. Heterogeneously branched interpolymers may be produced by Ziegler-Natta type catalysts or chromium-based catalysts, and contain a non-homogeneous distribution of comonomer among the molecules of the interpolymer. The comonomer may be an α-olefin. In some embodiments, the first ethylene-based polymer component and/or the second ethylene polymer component may be polymerized using Ziegler-Natta catalysts to form a bimodal polymer. In other embodiments, the first ethylene polymer component and/or the second ethylene polymer component may be polymerized using chromium-based catalysts. Suitable methods to polymerize ethylene monomers using chromium-based catalysts are generally known in the art, and may include gas-phase, solution phase and slurry-phase polymerization processes. In some embodiments, the first ethylene polymer component and/or the second ethylene polymer component may be polymerized in a gas-phase process, using a chromium catalyst, and in particular, a titanated chromium catalyst. Chromium catalysts and polymerization methods are further described in EP2218751, WO2004/094489, U.S. Pat. Nos. 4,100,105, and 6,022,933, which are incorporated herein in its entirety by reference. In some embodiments, the first ethylene polymer component and/or the second ethylene polymer component is an ethylene/α-olefin interpolymer, and further an ethylene/α-olefin copolymer. Trace amounts of impurities, for example, catalyst residues, may also be incorporated into and/or within the first ethylene polymer component.

In accordance with one or more embodiments of the present disclosure, the multimodal HDPE may have a density from 0.940 g/cm$^3$ to 0.970 g/cm$^3$ when measured according to ASTM D792. The multimodal HDPE composition may have a density from 0.940 g/cm$^3$ to 0.970 g/cm$^3$, or from 0.940 g/cm$^3$ to 0.965 g/cm$^3$, or from 0.940 g/cm$^3$ to 0.960 g/cm$^3$, or from 0.940 g/cm$^3$ to 0.955 g/cm$^3$, or from 0.945 g/cm$^3$ to 0.970 g/cm$^3$, or from 0.945 g/cm$^3$ to 0.965 g/cm$^3$, or from 0.945 g/cm$^3$ to 0.960 g/cm$^3$, or from 0.945 g/cm$^3$ to 0.955 g/cm$^3$, or from 0.950 g/cm$^3$ to 0.970 g/cm$^3$, or from 0.950 g/cm$^3$ to 0.965 g/cm$^3$, or from 0.950 g/cm$^3$ to 0.960 g/cm$^3$, or from 0.950 g/cm$^3$ to 0.955 g/cm$^3$, or from 0.955 g/cm$^3$ to 0.970 g/cm$^3$, or from 0.955 g/cm$^3$ to 0.965 g/cm$^3$, or from 0.955 g/cm$^3$ to 0.960 g/cm$^3$.

In some embodiments of the present disclosure, the multimodal HDPE may have a melt index (I$_2$) from 0.1 g/10 minutes (min.) to 10.0 g/10 min. when measured according to ASTM D1238 at 190° C. and a 2.16 kg load. The multimodal HDPE composition may alternatively have an I$_2$ from 0.1 g/10 minutes to 7.0 g/10 minutes, or from 0.1 g/10 minutes to 5.0 g/10 minutes, or from 0.1 g/10 minutes to 3.0 g/10 minutes, or from 0.1 g/10 minutes to 2.0 g/10 minutes. In other embodiments, the multimodal HDPE composition may have an I$_2$ from 1.0 g/10 minutes to 10.0 g/10 minutes, or from 1.0 g/10 minutes to 7.0 g/10 minutes, or from 1.0 g/10 minutes to 5.0 g/10 minutes, or from 1.0 g/10 minutes to 3.0 g/10 minutes, or from 1.0 g/10 minutes to 2.0 g/10 minutes. In some embodiments, the multimodal HDPE composition may have an I$_2$ from 3.0 g/10 minutes to 10.0 g/10 minutes 3.0 g/10 minutes to 7.0 g/10 minutes, or from 3.0 g/10 minutes to 5.0 g/10 minutes, or from 5.0 g/10 minutes to 10.0 g/10 minutes or from 5.0 g/10 minutes to 7.0 g/10 minutes, or from 7.0 g/10 minutes to 10.0 g/10 minutes.

In some embodiments, the multimodal HDPE composition may have a CDF$_{IR}$ greater than 0.27. In other embodiments, the CDF$_{IR}$ may be greater than 0.275, or greater than 0.280, or greater than 0.300, or greater than 0.320. Without being bound by theory, a CDF$_{IR}$ greater than 0.27 indicates that the bimodal resin has a sufficient amount of molecules within the multimodal resin having a molecular weight less than 15,000 g/mol. This may indicate a desired response to the nucleating agent upon crystallization because the small molecular weight molecules crystallize more rapidly than the large molecular weight molecules. In some embodiments, this CDF$_{IR}$ parameter greater than 0.27 correlates to an improved gas barrier while maintaining toughness within the resin.

According to one or more embodiments, the multimodal HDPE composition may have a ratio of CDF$_{IR}$ to CDF$_{LS}$ from 0.7 to 2.0. In other embodiments, the CDF$_{IR}$/CDF$_{LS}$ ratio may be from 0.7 to 1.5, or from 0.7 to 1.0, or from 0.7 to 0.75. Without being bound by theory, this ratio may indicate a suitable amount of high molecular weight shoulder without an excessive high molecular weight tail. Referring to FIG. 1, the term "high molecular weight shoulder," as used herein, refers to the area on a GPC chromatogram from 250,000 g/mol GPC molecular weight to 1,000,000 g/mol GPC molecular weight. Further referring to FIG. 1, the term "high molecular weight tail," as used herein, refers to the area on a GPC chromatogram of greater than 1,000,000 g/mol GPC molecular weight.

As mentioned, the CDF$_{IR}$/CDF$_{LS}$ ratio may indicate a suitable amount of high molecular weight shoulder without an excessive high molecular weight tail. For example, if the CDF$_{IR}$/CDF$_{LS}$ ratio is less than 0.7, the multi-modal resin may have too much high molecular weight tail within the multimodal resin. Moreover, if the CDF$_{IR}$/CDF$_{LS}$ ratio is greater than 2.0, the multi-modal resin may have too little high molecular weight shoulder within the multimodal resin. While some level of high molecular component (for example, high molecular weight shoulder) is important to provide the desired toughness of the resin, excessive high molecular tail may cause the molecules in the component to align in the flow direction during the molding process, preventing optimal nucleating by competing with the nucleating agent to crystallize the HDPE. The crystals nucleated by the high molecular weight tail may orient in the edge-on direction (the c-axis of polyethylene crystals lies in the plane of flow direction and cross direction), whereas crystals nucleated by the nucleating agent may orient in the in-plane direction (the c-axis of polyethylene crystals is perpendicular to the plane of flow direction and cross direction). Crystals oriented in the edge-on direction may not be as effective to block gas transmission as crystals oriented in the in-plane direction.

As stated above, the first ethylene polymer component may have a lower molecular weight and a higher density than the second ethylene polymer component. In one or more embodiments, the multimodal HDPE may comprise from 40 weight percent (wt. %) to 80 wt. % of the first ethylene polymer component. In other embodiments, the multimodal HDPE may comprise from 50 wt. % to 70 wt. %, or from 50 wt. % to 60 wt. % of the first ethylene polymer component. In one or more embodiments, the first ethylene polymer component may be an HDPE homopolymer.

In some embodiments, the multimodal HDPE may comprise 20 wt. % to 60 wt. % of the second ethylene polymer component. The multimodal HDPE may comprise from 25 wt. % to 50 wt. %, or from 30 wt. % to 45 wt. %, or from 30 wt. % to 40 wt. % of the second ethylene polymer component. In some embodiments, the second ethylene polymer component may be an HDPE interpolymer.

For example, and not by way of limitation, a suitable commercial example of the multimodal HDPE includes CONTINUUM™ DMDC-1250 NT7, available from The Dow Chemical Company (Midland, Mich.).

In accordance with embodiments described herein, the multimodal HDPE composition may be produced by a variety of methods. For example, the multimodal HDPE composition may be made by blending or mixing the first ethylene polymer component and the second ethylene polymer component together. Alternatively, the composition may be made in a single reactor or a multiple reactor configuration, where the multiple reactors may be connected in series or parallel, and where each polymerization takes place in solution, in slurry, in the gas phase, or a combination of reaction systems (e.g. combination of slurry and gas phase reactor). In some embodiments, a dual reactor configuration is used where the polymer made in the first reactor can be either the first ethylene polymer component or the second ethylene polymer component. The polymer made in the second reactor may have a density and melt index that the overall density and melt index of the composition is met. Similar polymerization processes are described in, for example, WO 2004/101674A, which is incorporated herein by reference in its entirety.

In some embodiments herein, a method of manufacturing the compositions described herein may comprise blending a first ethylene polymer component, as described herein, with a second ethylene polymer component, as described herein, thereby producing a polyethylene composition. In other embodiments, a method of manufacturing the compositions described herein may comprise polymerizing a first ethylene polymer component, as described herein, in a reactor and polymerizing a second ethylene polymer component, as described herein, in a reactor, thereby producing a polyethylene composition. The two reactors may be operated in series. In some embodiments, the first ethylene polymer component is polymerized in a first reactor, and the second ethylene polymer component is polymerized in a second reactor. In other embodiments, the second ethylene polymer component is polymerized in a first reactor, and the first ethylene polymer component is polymerized in a second reactor.

For the nucleating agent, various embodiments are contemplated. In some embodiments of the present disclosure, the nucleating agent may be an organic nucleating agent. For example and not by way of limitation, the organic nucleating agent may comprises one or more of metal carboxylates, metal aromatic carboxylate, hexahydrophthalic acid metal salts, stearates, organic phosphates, bisamides, sorbitols, and mixtures thereof. For example and not by way of limitation, suitable commercial examples of nucleating agents may include one or more of Hyperform® HPN-68L (which is primarily a disodium salt of bicyclo[2.2.1]heptane-2,3-dicarboxylic acid), Hyperform® HPN-20E (which is a mixture of zinc stearate and a calcium salt of 1,2-cyclohexanedicarboxylic acid), or Hyperform® HPN-600ei (which is primarily a disodium salt of bicyclo[2.2.1]heptane-2,3-dicarboxylic acid), or Hyperform® HPN-210M, which are available from Milliken Chemical (Spartanburg, S.C.).

In some embodiments of the present disclosure, the amount of nucleating agent used may be from 0.1 ppm to 300 ppm. In other embodiments, the amount of nucleating agent used may be from 10 ppm to 200 ppm, or from 25 ppm to 200 ppm, or from 50 ppm to 150 ppm, or from 50 ppm to 125 ppm, or from 75 ppm to 100 ppm of nucleating agent.

In some embodiments of the present disclosure, 75 ppm of the nucleating agent may increase the crystallization temperature ($T_c$) of the polyethylene formulation by at least about 1.0° C. when measured with differential scanning calorimetry (DSC). In other embodiments, 75 ppm of the nucleating agent may increase the $T_c$ of the polyethylene formulation by at least about 1.4° C. Furthermore, 75 ppm of the nucleating agent may increase the $T_c$ of the polyethylene formulation by at least about 1.5° C., or 1.8° C., or 2.0° C.

Another embodiment of the present invention includes, among other things, a molded or fabricated article produced from the polyethylene formulation. In some embodiments, the article may comprise an injection-molded film, an injection-molded article, a blown film, a blow molded article, a molded article, a thermally-molded article, a compression molded article, a melt-spun fiber, or an extruded article. The article may, in some embodiments, be a compression or injection molded article comprising the polyethylene formulation.

In some embodiments, the article may comprise a closure device. The closure device may comprise a bottle cap, a cap, a seal, a fitment, a lid or another means for closing or sealing an open-mouthed vessel. In some embodiments, the closure device may comprise a beverage closure device for closing or sealing an open-mouthed vessel, such as a carbonated soft drink or water bottle. In some embodiments, the closure device may close and seal an open-mouthed vessel. In some embodiments, an article produced from the polyethylene formulation may comprise an injection molded, compression molded, or thermally molded closure device.

In one or more embodiments, the article may have advantageous or desirable properties. For instance, the article may, among other things, provide improved barrier properties, improved ESCR, proper shrinkage, sufficient stiffness, and reduced article weight.

In accordance with one or more embodiments of the present disclosure, the article may provide an improved barrier, including, but not limited to an improved gas barrier. In some embodiments of the present disclosure, the article may have an oxygen transfer rate (OTR) improvement of at least 15% upon adding the nucleating agent due to the inventive formulation. In other embodiments, the article may provide an OTR improvement of at least 18%, or at least 20%, or at least 22%, or at least 25%, or at least 30%, or at least 50% upon adding the nucleating agent due to the inventive formulation. It should be understood that an improved OTR is indicative of other improved barrier qualities, and the article, in some embodiments, may additionally provide an improved water vapor barrier, an improved carbon dioxide barrier, or an improved nitrogen barrier.

In some embodiments of the present disclosure, the article may have an improved stiffness, demonstrated by an improved tensile modulus due to the inventive formulation. In other embodiments of the present disclosure, the article has improved color leveling performance and proper shrinkage due to the inventive formulation.

GPC Testing Standards

The GPC system used herein consisted of a PolymerChar GPC-IR (Valencia, Spain) high temperature GPC chromatograph equipped with an internal IR5 infra-red detector. The autosampler oven compartment was set at 160° C. and the column compartment was set at 150° C. The columns used were 4 Agilent Technologies "Mixed A" 30 cm by 20-micron linear mixed-bed columns and a 20-μm pre-column. The chromatographic solvent was 1,2,4 trichlorobenzene and contained 200 ppm of butylated hydroxytoluene (BHT). The solvent source was nitrogen sparged and the system was equipped with an on-line degasser from Agilent Technologies. The injection volume was 200 microliters and the flow rate was 1.0 milliliters/minute.

Calibration of the GPC column set was performed with 21 narrow molecular weight distribution polystyrene standards with molecular weights ranging from 580 g/mol to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 2 (as described in Williams and Ward, J. Polym. Sci., Polym. Let., 6, 621 (1968)):

$$M_{polyethylene} = A \times (M_{polystyrene})^B \quad \text{(Equation 2)}$$

where M is the molecular weight, A has a value of 0.4315 and B is equal to 1.0.

A third order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 g/mol Mw.

The total plate count of the GPC column set was performed with Eicosane (prepared at 0.04 g in 50 milliliters of TCB and dissolved for 20 minutes with gentle agitation.) The plate count (Equation 3) and symmetry (Equation 4) were measured on a 200 microliter injection according to the following equations:

$$\text{Plate Count} = 5.54 * \left( \frac{RV_{Peak\ Max}}{\text{Peak width at } \frac{1}{2}\text{height}} \right)^2 \quad \text{(Equation 3)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ Max})}{(RV_{Peak\ Max} - \text{Front Peak } RV_{one\ tenth\ height})} \quad \text{(Equation 4)}$$

where RV is the retention volume in milliliters and the peak width is in milliliters, "Peak Max" is the maximum position of the peak, one tenth height is the 1/10 height of the peak maximum, "Rear Peak" refers to the peak tail at later retention volumes than the Peak Max, and "Front Peak" refers to the peak front at earlier retention volumes than the Peak Max. The plate count for the chromatographic system was greater than 24,000 and symmetry was between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, and $Mw_{(GPC)}$ were based on GPC results using the internal IR5 detector (measurement channel) of the PolymerChar GPC-IR chromatograph according to Equations 5-6 below, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 2.

$$Mn_{(GPC)} = \frac{\sum_i IR_i}{\sum_i (IR_i / M_{polyethylene_i})} \quad \text{(Equation 5)}$$

$$Mw_{(GPC)} = \frac{\sum_i (IR_i * M_{polyethylene_i})}{\sum_i IR_i} \quad \text{(Equation 6)}$$

In order to monitor the deviations over time, a flowrate marker (decane) was introduced into each sample via a micropump controlled with the PolymerChar GPC-IR system. This flowrate marker (FM) was used to linearly correct the pump flowrate ($\text{Flowrate}_{(nominal)}$) for each sample by retention volume (RV) alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($\text{Flowrate}_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. Processing of the flow marker peak was done via the PolymerChar GPCOne™ Software. Acceptable flowrate correction is such that the effective flowrate should be within +/−2% of the nominal flowrate.

$$\text{Flowrate}_{(effective)} = \text{Flowrate}_{(nominal)} * (RV_{(FM\ Calibrated)} / RV_{(FM\ Sample)}) \quad \text{(Equation 7)}$$

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol.

Deconvolution of GPC Chromatogram

The fitting of the chromatogram into a high molecular weight and low molecular weight component fraction was accomplished using a Flory Distribution which was broadened with a normal distribution function as follows:

For the log M axis, 501 equally-spaced Log(M) points, spaced by 0.01, were established between 2 and 7 representing the molecular weight range between 100 g/mol and 10,000,000 g/mol where Log is the logarithm function to the base 10.

At any given Log (M), the population of the Flory distribution was in the form of Equation 8:

$$dW_f = \left(\frac{2}{M_w}\right)^3 \left(\frac{M_w}{0.868588961964}\right) M^2 e^{(-2M/M_w)} \quad \text{(Equation 8)}$$

where $M_w$ is the weight-average molecular weight of the Flory distribution and M is the specific x-axis molecular weight point, (10^[Log(M)]).

The Flory distribution weight fraction was broadened at each 0.01 equally-spaced log(M) index according to a normal distribution function, of width expressed in Log(M), σ; and current M index expressed as Log(M), μ.

$$f_{(LogM,\mu,\sigma)} = \frac{e^{-\frac{(LogM-\mu)^2}{2\sigma^2}}}{\sigma\sqrt{2\pi}} \quad \text{(Equation 9)}$$

It should be noted that before and after the spreading function has been applied that the area of the distribution ($dW_f$/d Log M) as a function of Log(M) is normalized to unity.

Two weight-fraction distributions, $dW_{f\,1}$ and $dW_{f\,2}$, for fractions 1 and 2 were expressed with two unique Mw target values, $Mw_1$ and $Mw_2$ and with overall component compositions $A_1$ and $A_2$. Both distributions were broadened with the same width, σ. A third component ($dW_{f\,E}$) was considered as an error function and had a component composition of $A_E$, and a broadened width of $\sigma_E$. The three distributions were summed as follows:

$$dW_f = A_1 dW_{f1} + A_2 dW_{f2} + A_E dW_{fE} \quad \text{(Equation 10)}$$

Where: $A_1 + A_2 + A_E = 1$

The weight fraction result of the measured (from Conventional GPC) GPC molecular weight distribution was interpolated along 501 log M points using a $2^{nd}$-order polynomial.

Microsoft Excel™ 2010 Solver was used to minimize the sum of squares of residuals for the equally-spaces range of 501 Log M points between the interpolated chromatographically determined molecular weight distribution and the three broadened Flory distribution components ($\sigma_{1 and 2}$ and $\sigma_E$), weighted with their respective component compositions, $A_1$, $A_2$, and $A_E$.

The iteration starting values for the components are as follows:

Component 1: Mw=30,000 g/mol, σ=0.300, and A=0.475
Component 2: Mw=250,000 g/mol, σ=0.300, and A=0.475
Error Component: Mw=4,000 g/mol, σ=0.025, and A=0.050
(Note $\sigma_1 = \sigma_2$ and $A_1 + A_2 + A_E = 1$)

The bounds for components 1 and 2 are such that σ is constrained such that σ>0.001, yielding an Mw/Mn of approximately 2.00 and σ<0.450, yielding a Mw/Mn of approximately 5.71. The composition, A, is constrained between 0.000 and 1.000. The Mw is constrained between 2,500 g/mol and 2,000,000 g/mol. For the error component, the bounds are such that σ is constrained such that σ>0.001, yielding an Mw/Mn of approximately 2.00 and σ<0.050, yielding an Mw/Mn of approximately 2.02. The composition, A, is constrained between 0.000 and 1.000. The Mw is constrained between 2,500 g/mol and 2,000,000 g/mol.

The "GRG Nonlinear" engine was selected in Excel Solver™ and precision was set at 0.00001 and convergence was set at 0.0001. The solutions were obtained after convergence (in all cases shown, the solution converged within 60 iterations).

CDF Calculation Method

Figure 2:
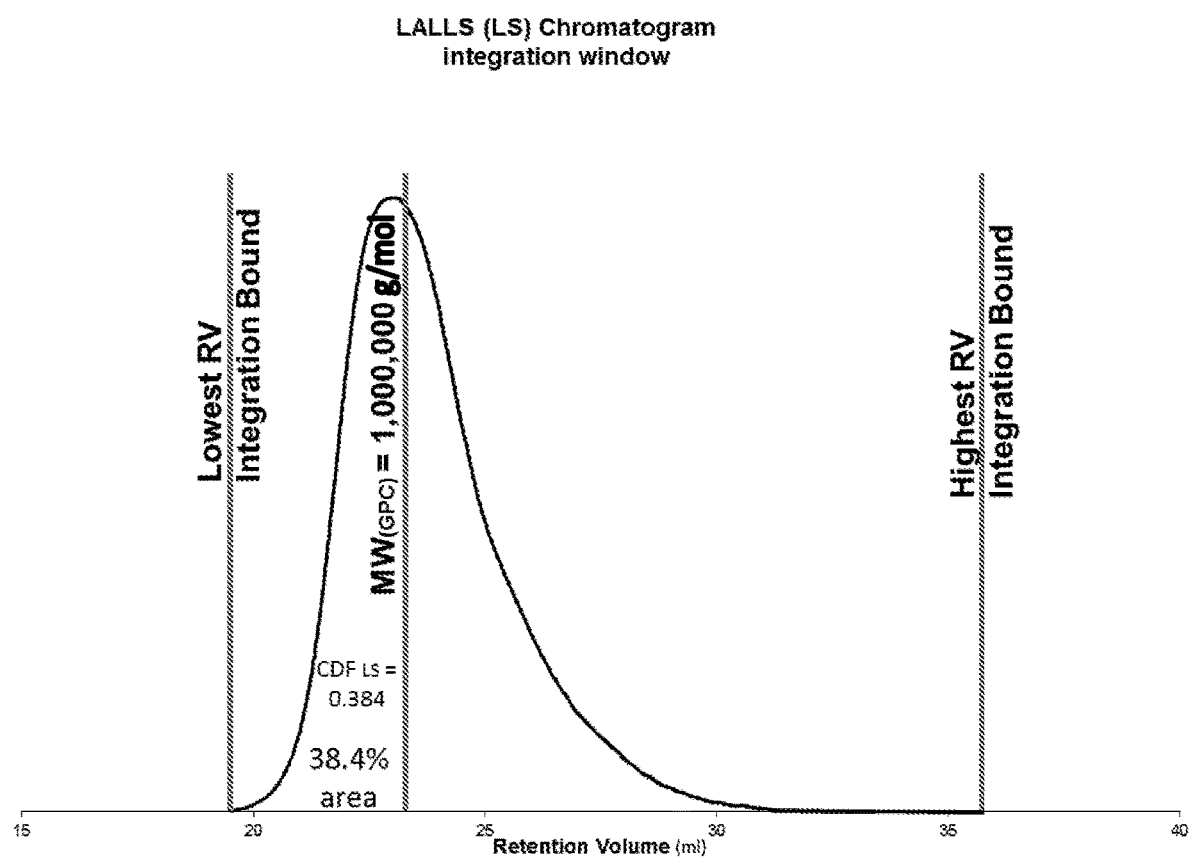
FIG. 2 is a graphical depiction of a Low Angle Laser Light Scattering (LALLS) detector chromatogram chromatogram integration window used in the calculation of $CDF_{LS}$ as detailed further below.

The calculation of the cumulative detector fractions for the IR5 measurement detector and the low angle laser light scattering detector are accomplished by the following steps: (Visually Represented as FIG. 1 and FIG. 2 for $CDF_{IR}$ and $CDF_{LS}$)

1) Linearly flow correct the chromatogram based on the relative retention volume ratio of the air peak between the sample and that of a consistent narrow standards cocktail mixture.

2) Correct the light scattering detector offset relative to the refractometer as described in the GPC section.

3) Calculate the molecular weights at each retention volume (RV) data slice based on the polystyrene calibration curve, modified by the polystyrene to polyethylene conversion factor of approximately (0.43) as described in the GPC section.

4) Subtract baselines from the light scattering and refractometer chromatograms and set integration windows using standard GPC practices making certain to integrate all of the low molecular weight retention volume range in the light scattering chromatogram that is observable from the refractometer chromatogram (thus setting the highest RV limit to the same index in each chromatogram). Do not include any material in the integration which corresponds to less than 150 MW in either chromatogram.

5) Calculate the CDF of the IR5 Measurement sensor ($CDF_{IR}$) and LALLS chromatogram ($CDF_{LS}$) based on its baseline-subtracted peak height (H) from high to low molecular weight (low to high retention volume) at each data slice (j) according to Equations 11A and 11B:

$$CDF_{IR} = \frac{\sum_{j=RV\ at\ 15,000MW}^{j=RV\ at\ Highest\ Integrated\ Volume} H_j}{\sum_{j=RV\ at\ Lowest\ Integrated\ Volume}^{j=RV\ at\ Highest\ Integrated\ Volume} H_j} \quad \text{(Equation 11A)}$$

$$CDF_{LS} = \frac{\sum_{j=RV\ at\ Lowest\ Integrated}^{j=RV\ at\ 1,000,000MW} H_j}{\sum_{j=RV\ at\ Lowest\ Integrated\ Volume}^{j=RV\ at\ Highest\ Integrated\ Volume} H_j} \quad \text{(Equation 11B)}$$

EXAMPLES

The following examples illustrate one or more additional features of the present disclosure described above.

Referring to Table 1 below, cumulative detector fraction values were computed for a polyethylene resin embodiment in accordance with the present disclosure and many comparative resins.

TABLE 1

Cumulative Detector Fractions of Various Resins

| Example | Resin | Supplier | $CDF_{IR}$ | $CDF_{LS}$ | $CDF_{IR}/CDF_{LS}$ | Density (g/cm³) | $I_2$ (g/10 min) | Comment |
|---|---|---|---|---|---|---|---|---|
| Example 1 | CONTINUUM ™ DMDC-1250 NT 7 (bimodal) | The Dow Chemical Company (Midland, MI) | 0.325 | 0.305 | 1.06 | 0.955 | 1.5 | Present Embodiment |
| Comparative Example 1 | Borealis BS 2581 | Borealis AG | 0.291 | 0.522 | 0.56 | 0.958 | 0.4 | The $CDF_{IR}/CDF_{LS}$ value <0.70 indicates too much high molecular weight tail |

TABLE 1-continued

Cumulative Detector Fractions of Various Resins

| Example | Resin | Supplier | $CDF_{IR}$ | $CDF_{LS}$ | $CDF_{IR}/CDF_{LS}$ | Density (g/cm³) | $I_2$ (g/10 min) | Comment |
|---|---|---|---|---|---|---|---|---|
| Comparative Example 2 | Hostalen ACP 6031D | LyondellBasell | 0.267 | 0.401 | 0.66 | 0.960 | 0.35 | $CDF_{IR}/CDF_{LS}$ value <0.70 and a $CDF_{IR}$ value <0.27 |
| Comparative Example 3 | Hostalen ACP 5831D | LyondellBasell | 0.251 | 0.407 | 0.62 | 0.958 | 0.3 | $CDF_{IR}/CDF_{LS}$ value <0.70 and a $CDF_{IR}$ value <0.27 |
| Comparative Example 4 | Exxon HDPE HD 9856B | ExxonMobil Corp. | 0.296 | 0.494 | 0.60 | 0.957 | 0.46 | The $CDF_{IR}/CDF_{LS}$ value <0.70 indicates too much high molecular weight tail |
| Comparative Example 5 | Alathon L5840 | LyondellBasell | 0.245 | 0.504 | 0.49 | 0.958 | 0.35 | $CDF_{IR}/CDF_{LS}$ value <0.70 and a $CDF_{IR}$ value <0.27 |
| Comparative Example 6 | Eltex ® B4020N1331 | Ineos Olefins & Polymers USA | 0.187 | 0.336 | 0.56 | 0.952 | 2.2 | $CDF_{IR}/CDF_{LS}$ value <0.70 and a $CDF_{IR}$ value <0.27 |
| Comparative Example 7 | UNIVAL ™ DMDA 6200 | The Dow Chemical Company (Midland, MI) | 0.243 | 0.254 | 0.96 | 0.953 | 0.39 | $CDF_{IR}$ value <0.27 |
| Comparative Example 8 | Exxon AA 45-004 (unimodal) | ExxonMobil Corp. | 0.223 | 0.234 | 0.95 | 0.946 | 0.32 | $CDF_{IR}$ value <0.27 |
| Comparative Example 9 | SURPASS ® HPs167-AB | Nova Chemicals | 0.417 | 0.037 | 11.42 | 0.967 | 1.2 | The $CDF_{IR}/CDF_{LS}$ value >2.00 indicates too little high molecular weight shoulder |

TABLE 2

Environmental Stress Crack Resistance of Various Resins

| Sample | | | ESCR, F50 (hrs) | | | |
|---|---|---|---|---|---|---|
| | | | 0 ppm | 75 ppm | 150 ppm | 300 ppm |
| Example | Resin | Supplier | HPN-20E | HPN-20E | HPN-20E | HPN-20E |
| Example 1 | CONTINUUM ™ DMDC-1250 NT 7 (bimodal) | The Dow Chemical Company (Midland, MI) | 170 | 175 | 138 | 281 |
| Comparative Example 1 | Borealis BS 2581 | Borealis AG | 71 | 82 | 86 | 45 |
| Comparative Example 2 | Hostalen ACP 6031D | LyondellBasell | 72 | 47 | 48 | 68 |
| Comparative Example 3 | Hostalen ACP 5831D | LyondellBasell | 93 | 86 | 94 | 94 |
| Comparative Example 4 | Exxon HDPE HD 9856B | ExxonMobil Corp. | 145 | 124 | 88 | 102 |
| Comparative Example 5 | Alathon L5840 | LyondellBasell | 31 | 35 | 26 | 26 |
| Comparative Example 6 | Eltex ® B4020N1331 | Ineos Olefins & Polymers USA | 17 | 16 | 27 | 20 |
| Comparative Example 7 | UNIVAL ™ DMDA 6200 | The Dow Chemical Company (Midland, MI) | 19 | 20 | 21 | 22 |
| Comparative Example 8 | Exxon AA 45-004 (unimodal) | ExxonMobil Corp. | 23 | 28 | 21 | 26 |

For Tables 2 and 3, samples were prepared from the above resins of Table 1, with the exception of Comparative Example 9. When Example 1 and Comparative Examples 1-8 included nucleating agent, a nucleating masterbatch was first prepared containing 97 wt % resin (carrier resin was DMDC-1250) and 3 wt % HPN-20E. The masterbatch was generated in a 30 mm co-rotating, intermeshing Coperion Werner-Pfleiderer ZSK-30™ twin screw extruder. The ZSK-30 had ten barrel sections with an overall length of 960 mm and an L/D ratio of 32. The extruder had multiple zones of varying temperature. Specifically, the temperature was set at 80° C. (zone 1—feed), 160° C. (zone 2), 180° C. (zone 3), 185° C. (zone 4), 195° C. (zone 5), and 210° C. (die). The masterbatch was pelletized after the extrusion.

The masterbatch was then melt blended with the various HDPE resins listed in Table 1 to produce the inventive and comparative formulations. The melt blending step was carried out on the ZSK-30 twin screw extruder using the same conditions described above. The HPN-20E concentration was diluted to 75 ppm level in the final inventive and comparative formulations. Sample formulations with 0 ppm HPN-20E were also prepared through the ZSK-30 extrusion in order to have the same thermal history. All sample formulations were pelletized after the extrusion.

The pellet samples were compression molded at 190° C. to the required nominal thickness according to ASTM D4703 per Annex A.1 Procedure C. The compression molded sheet was conditioned at 23° C. (+/−2° C.) and 50% RH (+/−5% RH) for at least 24 hours before the individual coupons were stamped out using an appropriate die. The coupons were further conditioned at 23° C. (+/−2° C.) and 50% RH (+/−5% RH) and tested at least 40 hours after compression molding and within 96 hours of compression molding. ESCR was measured according to ASTM-D 1693-01, Condition B. The sample thickness was measured to ensure they were within the ASTM 1693-01 specifications. Immediately prior to testing, the samples were notched to the required depth and then bent and loaded into the specimen holder. The holder was then placed in a test tube filled with a 10 percent, by volume, Igepal CO-630 (vendor Rhone-Poulec, NJ) aqueous solution, maintained at 50° C.

The ESCR value was reported as F50, the calculated 50 percent failure time from the probability graph. As shown in Table 2, even when low levels of nucleating agent are used with Example 1 of the present disclosure, the ESCR value is far superior than the Comparative Examples when using the same amount and same type of nucleating agent.

Referring now to Table 3 below, the crystallization temperature of the nucleated samples (pellet form) was obtained from differential scanning calorimetry. A TA Instruments Q1000 DSC, equipped with an RCS (refrigerated cooling system) and an autosampler was used to perform this analysis. During testing, a nitrogen purge gas flow of 50 ml/min. was used. The thermal behavior of the sample was determined by ramping the sample temperature up and down to create a heat flow versus temperature profile. First, the sample was rapidly heated to 180° C., and held under isothermal conditions for five minutes, in order to remove its thermal history. Next, the sample was cooled to −40° C., at a 10° C./minute cooling rate, and held under isothermal conditions at −40° C. for five minutes. The sample was then heated to 150° C. (this was the "second heat" ramp) at a 10° C./minute heating rate. The cooling curve was analyzed by setting baseline endpoints from the beginning of crystallization to −20° C. The crystallization temperature ($T_c$) was determined by the peak temperature from the cooling curve and is shown in Table 3 for the resin formulations of Table 1 with and without HPN-20E nucleating agent.

Using an injection molding process, 4 inch wide×6 inch long×60 mil thick plaques were fabricated with a Toyo 110 (commercially available from Maruka™) ton electric injection molding machine equipped with a 28 mm (diameter) screw. The temperature profile was set at 120° F./390° F./395° F./405° F./410° F./410° F. from throat to nozzle. The mold temperature was 90° F. The injection pressure was 12,000 psi with a fill time of 1.6 seconds. The hold pressure was set at 6,500 psi and the hold time was 12 seconds. The cooling time was 18 seconds and recovery time was 18 seconds. The screw speed was 85 rpm. A 90 ton clamp tonnage was used for all trials.

The oxygen transmission rate (OTR) of the plaques were tested by a Mocon OX-TRAN® 2/21 OTR measuring instrument according to ASTM D3985 at 23° C. and 0% relative humidity (RH). The average value of two plaques per resin sample was reported in Table 3 below. OTR improvement was calculated according to the following equation:

$$OTR\ \text{Improvement} = \frac{OTR\ \text{of Virgin Material} - OTR\ \text{of Nucleated Material}}{OTR\ \text{of Virgin Material}}$$

TABLE 3

Oxygen Transfer Rate and Crystallization Properties of Various Resins

| Example | Oxygen Transfer Rate (OTR) (cc · mil/100 in²/day) | | | Crystallization Temperature (° C.) | | |
|---|---|---|---|---|---|---|
| | 0 ppm HPN-20E | 75 ppm HPN-20E | OTR Improvement (%) | 0 ppm HPN-20E | 75 ppm HPN-20E | Increase in Tc |
| Example 1 | 132.5 | 104.5 | 21% | 117.8 | 119.4 | 1.6 |
| Comparative Example 1 | 229.3 | 214.1 | 7% | 120.3 | 120.4 | 0.1 |
| Comparative Example 2 | 176.6 | 155.3 | 12% | 119.6 | 120.5 | 0.9 |
| Comparative Example 3 | 185.0 | 162.4 | 12% | 119.0 | 119.9 | 0.9 |

TABLE 3-continued

Oxygen Transfer Rate and Crystallization Properties of Various Resins

| Example | Oxygen Transfer Rate (OTR) (cc · mil/100 in²/day) | | | Crystallization Temperature (° C.) | | |
|---|---|---|---|---|---|---|
| | 0 ppm HPN-20E | 75 ppm HPN-20E | OTR Improvement (%) | 0 ppm HPN-20E | 75 ppm HPN-20E | Increase in Tc |
| Comparative Example 4 | 200.6 | 214.8 | −7% | 119.2 | 119.9 | 0.7 |
| Comparative Example 5 | 247.6 | 215.8 | 13% | 120.1 | 120.8 | 0.7 |
| Comparative Example 6 | 151.7 | 124.3 | 18% | 118.2 | 119.6 | 1.4 |
| Comparative Example 7 | 247.6 | 229.4 | 7% | 118.5 | 118.6 | 0.1 |
| Comparative Example 8 | 294.1 | 280.8 | 5% | 117.6 | 117.9 | 0.3 |

Furthermore, as shown in Table 3, Example 1 shows an improved oxygen barrier and an increased crystallization temperature when compared to Comparative Examples 1-8. Without being bound by theory, it is clear that the Example 1 had a greater response to the nucleating agent than Comparative Examples 1-8. This greater response at lower nucleating agent levels consequently provides improved barrier properties for Example 1 in comparison to Comparative Examples 1-8. Moreover, the Example 1 with 75 ppm nucleating agent shows a good balance of oxygen barrier and ESCR. When 75 ppm of HPN-20E nucleating agent was added to the Example 1 resin, the recorded ESCR F50 value was 175 hours. At low nucleating agent levels, such as 75 ppm, the effect on ESCR was expected to be negligible; however, it was surprisingly found that 75 ppm of HPN-20E nucleating agent increased the ESCR of the Example 1 resin from 170 hours to 175 hours.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A polyethylene formulation comprising:
a bimodal high density polyethylene (HDPE) composition, and 0.1 ppm to 300 ppm of a nucleating agent, wherein the bimodal HDPE composition comprises a density of 0.940 g/cm³ to 0.970 g/cm³ when measured according to ASTM D792, and a melt index ($I_2$) of 0.1 g/10 min. to 10.0 g/10 min. when measured according to ASTM D1238 at 190° C. and a 2.16 kg load,
wherein the bimodal HDPE composition comprises an infrared cumulative detector fraction ($CDF_{IR}$) of greater than 0.27 and an infrared cumulative detector fraction to light scattering cumulative detector fraction ratio ($CDF_{IR}/CDF_{LS}$) from 0.7 to 1.1,
wherein the $CDF_{IR}$ is computed by measuring the area fraction of an IR5 measurement channel (IR) detector chromatogram less than 15,000 g/mol molecular weight using Gel Permeation Chromatography (GPC); and
wherein the $CDF_{LS}$ is computed by measuring the area fraction of a low angle light scattering (LALLS) detector chromatogram greater than 1,000,000 g/mol molecular weight using GPC.

2. The polyethylene formulation of claim 1, wherein the bimodal HDPE composition comprises a first ethylene polymer component and a second ethylene polymer component, wherein the first ethylene polymer component has a higher density than the second ethylene polymer component as determined from the following equation:

$$\frac{1}{overall.density.} = \frac{weight.fraction.of.1st.ethylene.component}{density.of.1st.ethylene.component} + \frac{weight.fraction.of.2nd.ethylene.component}{density.of.2nd.ethylene.component}$$

and wherein the first ethylene polymer component has a lower weight-average molecular weight than the second ethylene polymer component according to GPC.

3. The polyethylene formulation of claim 2, wherein the bimodal HDPE composition comprises 40 wt. % to 80 wt. % of the first ethylene polymer component, and 20 wt. % to 60 wt. % of the second ethylene polymer component.

4. The polyethylene formulation of claim 1, wherein the nucleating agent comprises an organic nucleating agent.

5. The polyethylene formulation of claim 1, wherein the nucleating agent comprises metal carboxylates, metal aromatic carboxylate, hexahydrophthalic acid metal salts, stearates, organic phosphates, bisamides, sorbitols, or mixtures thereof.

6. The polyethylene formulation of claim 1, wherein the $I_2$ is from 0.5 g/10 min. to 5.0 g/10 min and the density is from 0.950 g/cm³ to 0.960 g/cm³.

7. The polyethylene formulation of claim 1 comprising 10 ppm to 300 ppm of a nucleating agent.

8. The polyethylene formulation of claim 1 comprising 10 ppm to 150 ppm of a nucleating agent.

9. The polyethylene formulation of claim 1 comprising 0.1 ppm to 75 ppm of a nucleating agent.

10. The polyethylene formulation of claim 1, wherein 75 parts per million (ppm) of the nucleating agent increases the crystallization temperature ($T_c$) of the polyethylene formulation by at least about 1.0° C. as measured according to differential scanning calorimetry (DSC).

11. An article produced from the polyethylene formulation of claim 1, wherein the article is a molded article or fabricated article.

12. The article of claim 11, wherein the article provides an oxygen transmission rate improvement of at least about 15% when compared to similar articles that do not comprise the nucleating agent.

13. The article of claim 11, wherein the article comprises a closure device.

14. A compression or an injection molded article comprising the polyethylene formulation of claim 1.

15. The polyethylene formulation of claim 1, wherein the $I_2$ is from 0.5 g/10 min. to 10.0 g/10 min.

16. The polyethylene formulation of claim 1, wherein the $I_2$ is from 1 g/10 min. to 5.0 g/10 min.

17. The polyethylene formulation of claim 1, wherein the $CDF_{IR}$ is at least 0.30.

18. The polyethylene formulation of claim 1, wherein the $CDF_{IR}$ is at least 0.32.

* * * * *